Nov. 23, 1971 J. A. EVANS ET AL 3,621,701
MANUFACTURE OF GRIDS FOR THE PLATES
OF ELECTRIC STORAGE BATTERIES
Filed Aug. 19, 1969

INVENTORS
James A. Evans
Norman Shanks
BY
ATTORNEYS

United States Patent Office 3,621,701
Patented Nov. 23, 1971

3,621,701
MANUFACTURE OF GRIDS FOR THE PLATES OF ELECTRIC STORAGE BATTERIES
James Arthur Evans and Norman Shanks, Manchester, Lancashire, England, assignors to Electric Power Storage Limited, Manchester, Lancashire, England
Filed Aug. 19, 1969, Ser. No. 851,345
Claims priority, application Great Britain, Aug. 27, 1968, 40,945/68
Int. Cl. H01m *35/10, 35/22*
U.S. Cl. 72—364                                                7 Claims

ABSTRACT OF THE DISCLOSURE

In rolling a grid for an electric storage battery plate from a sheet of lead, dispersion strengthened lead, or lead alloy, the rollers are grooved so as to produce a grid of lattice-like pattern of interconnected bars or ribs comprising predominantly junctions from which only three bars radiate, the direction of rolling being such that at each such junction only one bar extends towards the junction but two bars diverge from it in the direction of rolling. The preferred pattern comprises rows of obtuse angled V portions each having the outer ends of its limbs joined to intermediate points in the limbs of adjacent V portions in an adjacent row.

---

This invention relates to grids for the plates of electric storage batteries, of the type comprising a lattice-like pattern of interconnected bars or ribs, and is particularly concerned with the manufacture of such grids by rolling a sheet material from which the gird is to be formed between rollers, such rollers being provided with grooves to produce an impression of the desired pattern in the form of an open lattice of interconnected bars, or in the form of a sheet having interconnected ribs formed on it. The term bars used herein is intended to include such ribs.

According to the present invention the pattern of grooves of the rollers is such that the grid produced comprises predominantly junctions from each of which only three bars radiate. Preferably two of the bars at a junction are substantially in line, so that the junction is in the form of a T or lower case y comprising two bars forming a head and a third bar forming a stem projecting from the head either perpendicularly or obliquely.

In one form of the invention the grid is in the form of a pattern formed of rows of V portions each having the outer ends of its limbs joined to intermediate points in the limbs of adjacent V portions in an adjacent row. The V portions may have an obtuse angle.

Alternatively such a pattern may be regarded as a diamond pattern with certain bars removed, or as a number of parallel zig-zag lines each section of which is prolonged, in one direction only, to join up in a V with a corresponding bar of the next zig-zag line.

It is believed preferable that at each junction the bars should not converge and then diverge, in the direction of rolling, as they do in a diamond pattern. This is ensured if the junctions are of T or Y form but it is also believed preferable that they should not converge but only diverge.

Thus in one form of the invention in a method of rolling a grid as set forth above the pattern and direction of rolling are such that at each junction of three bars only one bar extends towards the junction but two bars diverge from it in the direction of rolling.

It has previously been proposed to prepare grids for electric storage battery plates by rolling sheet lead to form a diamond pattern of bars or ribs. It has, however, now been found that at the junctions of the bars of such a grid minute cracks or fissures are liable to form.

Whilst the present invention is not dependent upon any particular theory, it is believed that these cracks may be due to the fact that when two bars converge towards a junction and two bars diverge from it, in the direction or rolling, they fail to unite.

Thus in order to ensure complete filling of the grooves the sheet metal offered to the rolls would be greater in cross-sectional area than that of the ultimate grid and the linear speed of the formed grid metal would be higher than that of the sheet metal being fed to the rolls. It has been found that there is less resistance to the flow of metal in the forward direction than in the transverse direction and the tendency is for the metal to advance rather than spread. From the moment the rollers grip the flat metal sheet there is a flow of metal along the grooves due to the increase pressure as the nip is reached. It is believed that the fissures are due to incomplete knitting at the junctions where two convergent streams meet and then divide.

If the number of bars is to remain substantially constant along the direction of rolling there must, of course, be other points at which bars terminate or unite. It is found that bars may converge to a V joint without causing the fissures referred to.

It is possible that at such a V joint the metal has no escape route along a groove extending in the direction of rolling and hence a higher local pressure arises and results in more complete knitting of the two streams of metal.

Alternatively or in addition it is possible that since, in a diamond pattern, there are four bars radiating from each junction, each being in line with one of the others, a change in length of a portion of a bar cannot readily be accommodated. In a preferred arrangement in accordance with the present invention at each junction of more than two bars each portion of a bar terminates as the stem of a T-junction and a change in length of the stem of the T can readily be accommodated by slight bending of the head of the T.

The invention may be put into practice in various ways but one specific embodiment will be described by way of example with reference to the accompanying drawings in which.

The grid of lead or lead alloy or dispersion strengthened lead is formed by rolling sheet material between a pair of rolls in generally known manner, for example as described in British patent specification No. 1,113,055.

Figure 3:
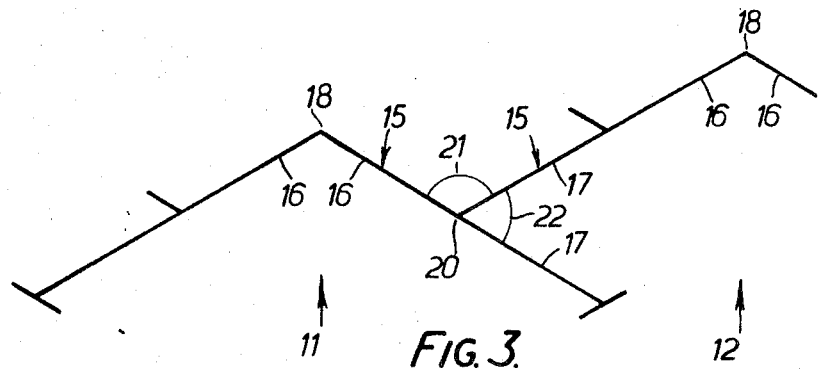
FIG. 3 is a diagram to facilitate explanation of the geometry of the grid.

In accordance with the present invention the rollers by which the material is rolled are formed with impressions such that the pattern of the grid produced may be regarded as made up of a number of rows (in the embodiment shown three rows 11, 12 and 13) of obtuse angled inverted, V shaped portions 15 in each row being spaced apart along the row, but connected together by the ends of portions of neighbouring rows. In the embodiment the angle of the V is 120°. Thus each V shaped portion may be regarded as comprising two limbs each having an inner half 16 nearer to the apex 18 and an outer half 17 further from it. Thus, as illustrated diagrammatically in FIG. 3, the outer end of each limb (e.g. in row 12) is joined to an intermediate point of the limb of an adjacent V portion in an adjacent row (e.g. row 11), to form a junction 20 of generally T form. At each junction 20 the stem formed by the outer half 17 of a limb of one V shaped portion connected to an intermediate point of a second V shaped portion extends parallel to the other limb of the latter portion, and, since the V shaped portions are obtuse angled, the T junctions are of slightly distorted or lower case y (form), that is to say the stem of the T is not at right angles to its head but forms an obtuse angle 21 (equal to that of the V, namely 120°) with the inner half 16 of the head, and a supplementary acute angle 22 (actually 60°) with the outer half 17 of the head.

A number of grids may be rolled in a single length from continuous strip, and then cut off to form individual grids. If preferred the lugs may be formed separately and welded to the grids.

Figure 1:
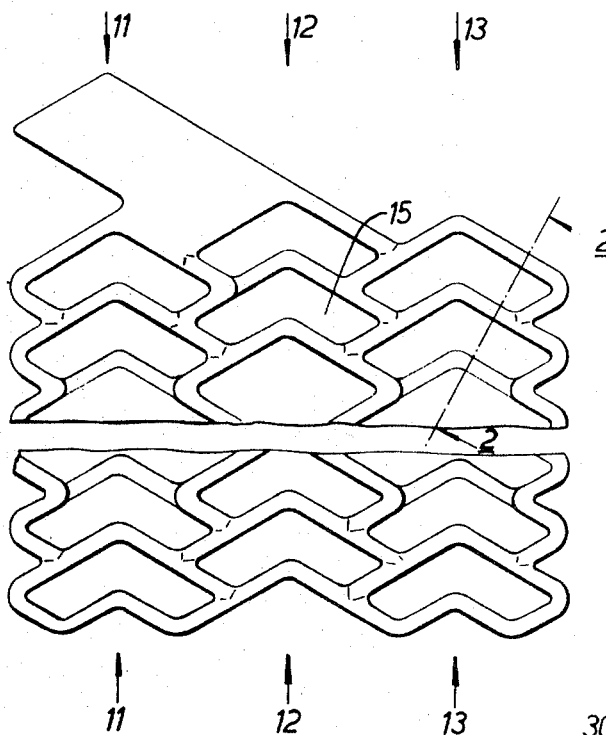
FIG. 1 is a front view of one form of rolled grid for a lead acid storage battery plate.

As shown in FIG. 1 the grid is provided with a lug 25 which will be at the top in the finished battery.

The rolling takes place from the top to the bottom of each V shaped portion (and hence from the bottom to the top of the grid) so that the groove for only one bar, the outer half 17 of the limb of a V, approaches the nip of the rollers as a T junction is about to be formed, but two bars, the inner half 16 of the limb of the said V and the outer half 17 of a limb of a neighbouring V, diverge from it in the direction of rolling.

As indicated above, the result of this is that at a T junction there is no attempt to unite two bars as they are formed, but merely to separate one bar into two bars, and it is believed that this may avoid the formation of cracks or fissures that are liable to occur with a complete diamond pattern.

Figure 2:
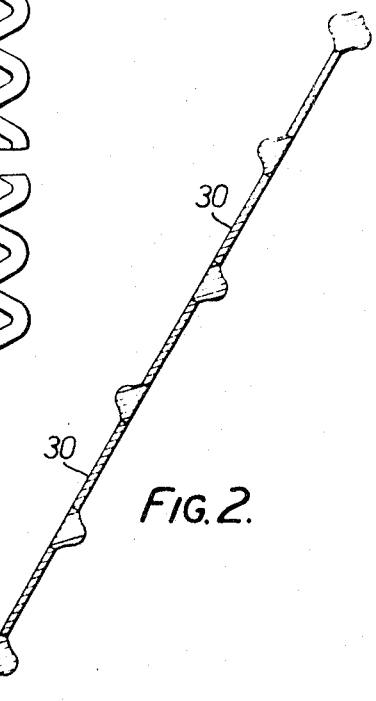
FIG. 2 is an enlarged section on the line 2—2 of FIG. 1.

It is not necessary that all the bars should be of the same thickness, and in the specific embodiment described the outer half 17 of each V is about twice the cross-section of the inner half. Thus the lattice may be regarded as made up of four zig-zag vertical spines, formed from the outer halves 17 of the V shaped portions, connected together by smaller inverted V shaped portions formed of the inner halves, the latter having about half the cross-section of the said spines. As shown in FIG. 2 the inner halves of alternate V shaped portions in a row are displaced alternately in opposite directions from the central plane of the grid.

The rolling may be such as to form a grid with spaces between the bars, but in the specific embodiment shown webs 30 are left between the bars which then take the form of ribs on a sheet material, as indicated in FIG. 2. Accordingly the inner halves of the V shaped portions in a row project alternately from opposite faces of the web, each being flush with the surface of the web on the other side, while the outer halves or zig-zag spines, project from both faces.

The webs may be perforated or punched in the manner of expanded metal or they may be removed before the grid is used.

The dimensions of the bars may vary in accordance with requirements. In the specific embodiment shown in the drawings for a grid about 2″ wide and about 3½″ high the thickness of the full section outer halves 17 of the V shaped portions or zig-zag spines is about .076″ whilst the thickness of the web 30 is about .010″, the section of each inner half 16 of the limb of a V, including the corresponding portion of the web, is half that of the outer half. Such a grid may conveniently be formed by rolling a sheet of pure lead of the order of .040 inch thick.

When using a relatively brittle alloy having but little ductility at room temperature it may be desirable to preheat the sheet metal, for example to about 200° C.

The deails of the grid may vary in accordance with requirements. In particular the V shaped portions may be replaced by curved or arcuate portions while the portions along the edges will generally be cut off to form a zig-zag edge.

What we claim as our invention and desire to secure by Letters Patent is:

1. A grid for a plate of an electric storage battery which comprises a lattice-like pattern of interconnected bars or ribs wherein substantially all the junctions are junctions from each of which only three bars radiate, wherein two of said bars radiate at acute angles to, and on opposite sides of, a given direction common to all such junctions, and a third of said bars radiates at an obtuse angle to said direction.

2. A grid as claimed in claim 1 in which the junction is in the form of a lower case y which comprises two bars in line forming a head and a third bar forming a stem projecting from the head.

3. A grid as claimed in claim 2 in which the third bar forms a stem projecting from the head obliquely.

4. A grid for a plate of an electric storage battery, comprising a lattice-like pattern of interconnected bars or ribs formed of rows of V portions each having the outer ends of its limbs joined to intermediate points in the limbs of adjacent V portions in an adjacent row.

5. A grid as claimed in claim 4 in which the V portions have an obtuse angle.

6. A method of rolling a sheet material to form a grid for a plate of an electric storage battery, which comprises a lattice-like pattern of interconnected bars or ribs formed of rows of V portions each having the outer ends of its limbs joined to intermediate points in the limbs of adjacent V portions in an adjacent row, employing rollers having grooves wherein the pattern and direction of rolling are such that at each junction of three bars only one bar extends towards the junction but two bars diverge from it in the direction of rolling.

7. A method as claimed in claim 6 in which the sheet material of the grid is preheated before rolling.

References Cited

UNITED STATES PATENTS

| 405,996 | 6/1889 | Griscom | 29—2 |

FOREIGN PATENTS

| 97,104 | 5/1898 | Austria | 136—36 |
| 208,286 | 8/1956 | Australia | 136—36 |
| 1,113,055 | 5/1968 | Great Britain | 136—36 |

WILLIAM S. LAWSON, Primary Examiner

U.S. Cl. X.R.

29—2; 72—365; 136—36